(12) United States Patent
Rival et al.

(10) Patent No.: US 11,125,638 B2
(45) Date of Patent: Sep. 21, 2021

(54) APPARATUS AND METHOD FOR MEASURING FORCE AND POWER DURING UNSTEADY FLUID MOTIONS

(71) Applicant: Queen's University at Kingston, Kingston (CA)

(72) Inventors: David Rival, Kingston (CA); Scott Fitzpatrick, Kingston (CA); Louis Burelle, Kingston (CA)

(73) Assignee: Queen's University at Kingston, Kingston (CA)

( * ) Notice: Subject to any disclaimer, the term of this patent is extended or adjusted under 35 U.S.C. 154(b) by 132 days.

(21) Appl. No.: 16/273,294

(22) Filed: Feb. 12, 2019

(65) Prior Publication Data

US 2019/0250057 A1     Aug. 15, 2019

Related U.S. Application Data

(60) Provisional application No. 62/629,269, filed on Feb. 12, 2018.

(51) Int. Cl.
    *G01L 13/06*        (2006.01)
    *A63B 24/00*        (2006.01)

(52) U.S. Cl.
    CPC .......... *G01L 13/06* (2013.01); *A63B 24/0062* (2013.01); *A63B 2220/34* (2013.01);
(Continued)

(58) Field of Classification Search
CPC . G01L 13/06; A63B 24/0062; A63B 2220/56; A63B 2244/20; A63B 2069/068
See application file for complete search history.

(56) References Cited

U.S. PATENT DOCUMENTS

2013/0054143 A1*   2/2013   DeGolier ................ G01M 9/06
                                                        702/3
2014/0230571 A1*   8/2014   Pape ..................... G01M 10/00
                                                     73/862.381

(Continued)

FOREIGN PATENT DOCUMENTS

GB             2541471 A      2/2017

OTHER PUBLICATIONS

Takagi, H. & Sanders, R. Measurement of Propulsion by the Handduring Competitive Swimming. The engineering of Sport, $, pp. 631-637. (Year: 2002).*

(Continued)

*Primary Examiner* — Natalie Huls
(74) *Attorney, Agent, or Firm* — Stephen J. Scribner

(57) ABSTRACT

Apparatus and methods for measuring force exerted by an object moving in a fluid or force of a moving fluid on a stationary object. Embodiments may be configured to measure power exerted by an object moving in a fluid. At least one sensor disposed on the object outputs at least one sensor signal corresponding to a pressure differential between first and second surfaces of the object. Data derived from one or more sensor signals may be processed according to a model to output a measure of the force and/or power of the object moving in the fluid or the force of the moving fluid on the stationary object, as a function of time. Embodiments may be configured for applications such as providing feedback for control of actuators in electromechanical systems for liquid or gaseous media, and providing performance metrics during water sports, such as swimming and paddling.

21 Claims, 6 Drawing Sheets

(52) U.S. Cl.
CPC ....... *A63B 2220/44* (2013.01); *A63B 2220/53* (2013.01); *A63B 2220/56* (2013.01); *A63B 2244/20* (2013.01)

(56) References Cited

U.S. PATENT DOCUMENTS

| | | | |
|---|---|---|---|
| 2017/0043212 A1* | 2/2017 | Wong | H04L 67/2823 |
| 2017/0046979 A1 | 2/2017 | Lehary | |
| 2017/0074897 A1* | 3/2017 | Mermel | G01S 19/19 |
| 2017/0128808 A1* | 5/2017 | Auvinen | A61B 5/1124 |
| 2019/0301969 A1* | 10/2019 | Morton | G01P 21/025 |
| 2020/0254308 A1* | 8/2020 | Walthert | G01L 19/0092 |

OTHER PUBLICATIONS

Takagi, H. et al. "Unsteady hydrodynamic forces acting on a robotic hand and its flow field". Journal of Biomechanics, v. 46, pp. 1825,1832. (Year: 2013).*

Takagi, H. et al. "Unsteady hydrodynamic forces acting on a hand and its flow field during sculling motion". Human Movement Science, v. 28, pp. 133-142. (Year: 2014).*

Rosi, G., et al., "Entrainment and Topology of Accelerating Shear Layers", Journal of Fluid Mechanics, vol. 811, pp. 37-50, (2017).

Fernando, J., et al., "Reynolds-Number Scaling of Vortex Pinch-Off on Low Aspect Ratio Propulsors", Journal of Fluid Mechanics, vol. 799, R3, (2016).

Takagi, H. et al., "Numerical and Experimental Investigations of Human Swimming Motions", Journal of Sports Sciences, vol. 34.16, pp. 1564-1580, (2016).

"Power Meters in Cycling." Peak & Valley Coaching, May 29, 2017, www.pvcoaching.com/2017/05/29/power-meters-cycling/. Accessed Sep. 20, 2017.

Vance, J. "The 8 Biggest Benefits of Running with Power." Triathlete.com, Feb. 28, 2017, www.triathlete.com/2017/02/run/8-biggest-benefits-running-power__299066, Accessed Sep. 20, 2017.

* cited by examiner

APPARATUS AND METHOD FOR MEASURING FORCE AND POWER DURING UNSTEADY FLUID MOTIONS

RELATED APPLICATION

This application claims the benefit of the filing date of Application No. 62/629,269, filed on Feb. 12, 2018, the contents of which are incorporated herein by reference in their entirety.

FIELD

This invention relates to apparatus and methods for measuring force and power exerted by a moving object in a fluid medium. Applications may include providing feedback for control of actuators in electromechanical systems for liquid or gaseous media, and providing performance metrics during water sports, such as swimming and paddling.

BACKGROUND

Power meters are available for cycling and running, but for water-based activities the technology is still being developed. This, in large part, is due to the complex fluid dynamic environment which has prevented data collection for the development of a meaningful power meter for such activities. In particular, the advancement of swimming analytics has been impeded by the complex fluid dynamics involved in a swimming stroke. The current metrics by which swimming performance improvement is measured (e.g., SWOLF scores that account for lap time and stroke cadence) are not nearly as useful as quantitative time-resolved forces and power readings. Swimming metrics (e.g., lap time, pace, stroke count, etc.) may be incorporated into wearable technologies, but currently these are rudimentary in nature and do not account for the force and power of a swimmer's strokes.

The Platysens SEAL (platysens.com/seal) is a product under development for swimming that measures the local point force pushing on the palm of the hand. This device only measures the stagnation pressure, which is derived from the local velocity at the palm and is not indicative of the net force of the hand itself. Out-of-water swimming power meters also exist, such as the Vasa Swimming Ergometer (vasatrainer.com/product/swim-ergometer-swimming-machine).

However, such devices are only capable of measuring the theoretical power of a swimmer, and not the actual swimming power in situ. As swimming is a highly technical sport, out-of-water power meters are rendered meaningless as an indicator of power-based training improvements to swimming performance. As an example, one need not know how to swim in order to use an out-of-water power meter, therefore any improvements in dry-land power performance would not necessarily lead to improvements in swim capabilities. In fact, swimming performance is so-closely related to hydrodynamic resistance that often trying to swim faster will lead to worse results as the swimmer creates a less streamlined body position, increasing resistance, and causing the swimmer to tire more quickly without swimming any faster.

SUMMARY

One aspect of the invention relates to apparatus for measuring force of an object moving in a fluid, or force of a moving fluid on a stationary object. That is, an apparatus is provided for measuring force on an object in a fluid, wherein at least one of the object and the fluid is moving. Another aspect of the invention relates to apparatus for measuring force and/or power exerted by an object moving in a fluid medium. Embodiments include features that allow for force and power measurements of objects in complex unsteady fluid dynamic environments, and thus overcome obstacles which have prevented data collection for the development of a meaningful force/power meter for such conditions.

Embodiments include an in-water power meter that is configured for water-based activities involving moving an object through water, such as paddling and swimming. Such embodiments allow power-based assessment to be directly tied to mechanics of the activity and overall performance. Embodiments for water sports provide data that permit an individual to examine his/her power metrics in relation to different stroke mechanics and assess overall output, thus allowing the individual to fine-tune their mechanics and exertion strategy to optimize performance. Embodiments provide swimming power measured in situ, which may be coupled with classical swimming metrics to provide more meaningful metrics, allowing a swimmer to correlate swimming power with technique, optimizing the delicate balance between exertion and maintaining a streamlined body position that minimizes hydrodynamic resistance.

Embodiments may be configured for other applications where power-based assessment of an object in other liquids or in gaseous media such as air is required. For example, embodiments may be configured to provide feedback on unsteady actuation of components of aircraft, drones, water craft, etc., or of actuators in gaseous or liquid flow systems, etc.

Another aspect of the invention relates to apparatus for measuring force of an object moving in a fluid or force of a moving fluid on a stationary object, comprising: at least one first sensor disposed on the object that outputs at least one first sensor signal corresponding to a pressure differential between first and second surfaces of the object; data acquisition device that receives the at least one first sensor signal; and a processor in communication with the data acquisition system that processes differential pressure data derived from the at least one first sensor signal according to a model and outputs a measure of the force of the object moving in the fluid or the force of the moving fluid on the stationary object, as a function of time.

Also provided herein is an apparatus for measuring force on an object in a fluid, wherein at least one of the object and the fluid is moving, comprising: at least one differential pressure sensor adapted to be disposed on the object that outputs at least one sensor signal corresponding to a pressure differential between first and second surfaces of the object; a data acquisition device that receives the at least one differential pressure sensor signal; and a processor in communication with the data acquisition system that processes differential pressure data derived from the at least one differential pressure sensor signal according to a model and outputs a measure of the force on the object in the fluid, as a function of time.

In one embodiment, the at least one differential pressure sensor may comprise a first absolute pressure sensor adapted to be disposed on the first surface of the object and outputs a sensor signal corresponding to a pressure on the first surface of the object; a second absolute pressure sensor adapted to be disposed on the second surface of the object outputs a sensor signal corresponding to a pressure on the second surface of the object; wherein the acquisition device receives the sensor signals corresponding to the pressures on the first and second surfaces of the object; wherein the processor determines a differential pressure on the object from the sensor signals corresponding to the pressures on the first and second surfaces of the object.

In one embodiment the apparatus may be further configured for measuring power exerted by the object moving in the fluid, comprising: at least one second sensor disposed on the object that outputs at least one second sensor signal; wherein the data acquisition device receives the at least one second sensor signal; wherein the processor processes differential pressure data derived from the at least one first sensor signal and at least velocity data derived from the at least one second sensor signal and outputs a measure of the power exerted by the object moving in the fluid, as a function of time.

In one embodiment, the at least one second sensor outputs at least one second sensor signal corresponding to linear velocity and/or rotational velocity.

In one embodiment, the at least one second sensor comprises an inertial measurement unit (IMU) that outputs at least one second sensor signal corresponding to linear and rotational acceleration of the object moving in the fluid.

In one embodiment, the processor subjects the differential pressure data and the velocity data to processing according to calibration data and a low-order model based on motion of the object.

In one embodiment, the apparatus comprises a location sensor disposed on the object or in close proximity to the object that outputs a signal corresponding to location of the object.

In various embodiments, the object may be a human limb, or a part of a human limb, and the apparatus outputs a measure of the force and/or power exerted by the human limb moving in water.

In various embodiments, the object may be a paddle, or part of a paddle, and the apparatus outputs a measure of the force and/or power exerted by the paddle moving in water.

Another aspect of the invention relates to a method for measuring force exerted by an object moving in a fluid or force of a moving fluid on a stationary object, comprising: disposing at least one first sensor on the object wherein the at least one first sensor outputs at least one first sensor signal corresponding to a pressure differential between first and second surfaces of the object; receiving the at least one first sensor signal; and using a processor to process differential pressure data derived from the at least one first sensor signal according to a model and output a measure of the force of the object moving in the fluid or the force of the moving fluid on the stationary object, as a function of time.

Also provided herein is a method for measuring force on an object in a fluid, wherein at least one of the object and the fluid is moving, comprising: disposing at least one differential pressure sensor on the object wherein the at least one differential pressure sensor outputs at least one first sensor signal corresponding to a pressure differential between first and second surfaces of the object; receiving the at least one first sensor signal; and using a processor to process differential pressure data derived from the at least one differential pressure sensor signal according to a model and output a measure of the force on the object in the fluid, as a function of time.

The method may comprise disposing a first absolute pressure sensor on the first surface of the object, wherein the first absolute pressure sensor and outputs a sensor signal corresponding to a pressure on the first surface of the object; disposing a second absolute pressure sensor on the second surface of the object, wherein the second absolute pressure sensor outputs a sensor signal corresponding to a pressure on the second surface of the object; receiving the sensor signals corresponding to the pressures on the first and second surfaces of the object; using the processor to determine a differential pressure on the object from the sensor signals corresponding to the pressures on the first and second surfaces of the object.

In one embodiment, the method may be configured for measuring power exerted by the object moving in the fluid, comprising: disposing at least one second sensor on the object wherein the at least one second sensor outputs at least one second sensor signal; receiving the at least one second sensor signal; and using a processor to process differential pressure data derived from the at least one first sensor signal and velocity data derived from the at least one second sensor signal and output a measure of the power exerted by the object moving in the fluid, as a function of time.

In various embodiments, the object may be a human limb, or a part of a human limb, and the method may comprise using the apparatus to output a measure of the force and/or power exerted by the human limb moving in water.

In various embodiments, the object may be a paddle, or a part of a paddle, and the method may comprise using the apparatus to output a measure of the force and/or power exerted by the paddle moving in water.

BRIEF DESCRIPTION OF THE DRAWINGS

For a greater understanding of the invention, and to show more clearly how it may be carried into effect, embodiments will be described, by way of example, with reference to the accompanying drawings, wherein.

DETAILED DESCRIPTION OF EMBODIMENTS

Figure 1:
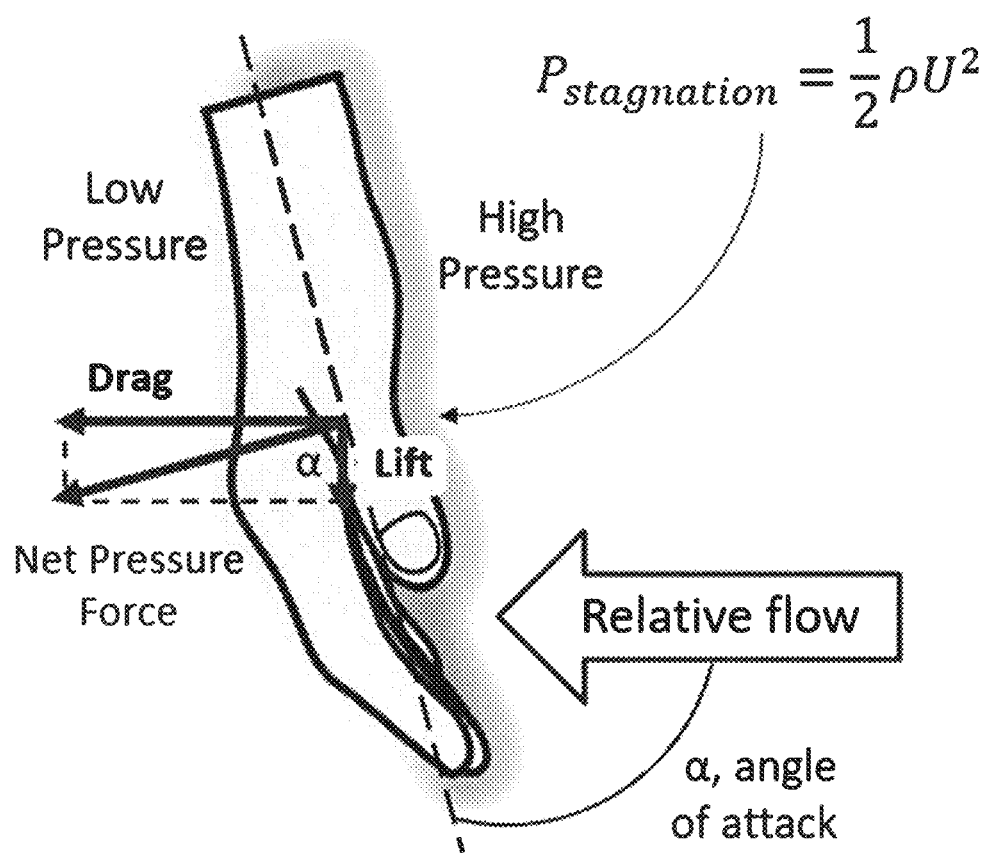
FIG. 1 is a diagram showing forces acting on a hand during a swimming stroke.

When a non-streamlined object is moved through a fluid medium (e.g., water), it is the instantaneous reaction force dominated through the pressure distribution on the object that ultimately determines the power output used to generate the motion. Only for slender, streamlined bodies does shear stresses on the surface contribute significantly to the total force in question. This hydrodynamic force is largely dependent on the behaviour of the instantaneous wake extending behind the object. If the object moves through various rectilinear and/or rotational accelerations, there is a resulting unsteady separated flow on the backside of the object which is complex and cannot be estimated using potential flow methods based on analytical theory. The time-varying wake is complex even for relatively simple dynamic motions of an object in controlled experiments, and it influences the instantaneous force response.

Apparatus and methods as described herein may be adapted for applications in various fields, such as electromechanical control systems in liquid or gaseous media. One such application is control of aerodynamic/hydrodynamic actuators of autonomous vehicles. Another application is a force and/or power meter for water sports, such as swimming or paddling. It is generally assumed herein that the apparatus and methods are applicable to liquids and gases alike so long as flow speeds are low with respect to the speed of sound, i.e., low Mach number flows. For this reason, experimental data that has been collected in a water facility holds equally well as applied to gases such as air at ambient conditions. Thus, whereas embodiments are described herein with respect to water sports and particularly swimming, it will be appreciated that the invention is not limited thereto. Further, whereas embodiments are described in terms of measuring force and power of an object moving in a fluid, it will be appreciated that certain embodiments are also applicable to measuring force exerted on stationary objects in a moving fluid, as may be the case, for example, for objects in electromechanical control systems in liquid or gaseous media.

Embodiments described herein employ one or more sensors to obtain data relating to one or more parameters of an object moving in a fluid, at least one such parameter being differential pressure, and using data processing methods based on low-order (i.e., physics-based) modeling, coupled with calibration data, to inform a semi-empirical model. At least one sensor may comprise, for example, a differential pressure sensor. In some embodiments, the differential pressure sensor may be implemented using two absolute pressure sensors configured so that a differential pressure signal may be obtained. For example, a first absolute pressure sensor may be disposed on a first side of the object, and a second absolute pressure sensor may be disposed on a second side of the object. Signals obtained from the first and second absolute pressure sensors may then be processed to obtain a differential pressure signal. Such use of first and second absolute pressure sensors may advantageously be used in applications where it is not possible or desirable to dispose a differential pressure sensor, e.g., due to the requirement that the differential pressure sensor must be disposed through the object. Data relating to instantaneous pressure differential may be obtained at one, two, or several locations of the object. Data relating to one or more other parameters of the object, such as one or more of position, orientation, velocity, and acceleration, may be obtained and incorporated into the data processing, such data being collected using one or more other sensors (e.g., an IMU, one or more accelerometers, etc.) disposed on the object. For example, six-degree-of-freedom (6 DOF) measurements of the object motion in time may be obtained and the data used together with instantaneous pressure differential data in the processing model. Low-order modelling may include reducing the complex motions of the object's movement in the fluid into a small number of constituent components. Processing of the sensor data may be subjected to tuning according to sensor calibration data. According to such embodiments, a measure of the force and power exerted into the fluid medium by the object may be resolved to a high degree of accuracy. The accuracy is enhanced through the use of highly-sensitive and miniaturized sensors.

As noted above, one application of embodiments described herein is a force and/or power meter for water sports, such as swimming or paddling, where the object is a limb or paddle that is moved through water for propulsion. Despite strong interest (e.g., from athletes) for such a device, currently there are no sensor devices or products that take the effects of unsteady separated flow into account to accurately determine force and power. For example, the Platysense SEAL™ (U.S. Patent Application Publication No. 20170043212A) is a sensor for swimming that only measures the local force pushing on the palm of the hand. This only provides a measure of the stagnation pressure, which is derived from the velocity of the hand and is not indicative of the force exerted by the hand.

Embodiments described herein overcome these challenges by using one or more sensors to obtain data relating to one or more parameters of the object (e.g., a hand or a paddle) moving in the fluid (e.g., water), at least one such parameter being differential pressure, and using data processing methods based on low-order (i.e., physics-based) modeling, coupled with calibration data, to inform a semi-empirical model. For example, data relating to instantaneous pressure differential may be obtained at one, two, or several locations of the hand. Data relating to one or more other parameters of the hand, such as one or more of position, orientation, and velocity, may be obtained and incorporated into the data processing, such data being collected using one or more other sensors (e.g., an IMU) disposed on the hand. For example, six-degree-of-freedom (6 DOF) measurements of the object motion in time may be obtained and the data used together with instantaneous pressure differential data in the processing model. Low-order modelling may include reducing the complex motions of a swimming stroke into a small number of constituent components.

A power meter for water sports according to embodiments described herein provides a true quantitative metric for training of professional and recreational athletes. Embodiments may be configured to characterize stroke performance for any water-based propulsion activity (including but not limited to swimming, canoeing, kayaking, paddling, etc.).

An embodiment based on the approach shown diagrammatically in FIG. 1 will now be described, in which a measure of the pressure difference between both sides of an object (a hand is shown) together with the object angle and velocity are correlated to forces and power. As shown in FIG. 1, during a swimming stroke, the component of the net pressure force acting in the direction of desired propulsion is the drag force. The angle of attack is $\alpha$. The stagnation pressure demonstrates that the pressure at the center of the palm is only a function of density ($\rho$) of the fluid and velocity (U), whereas the base pressure on the backside of the hand is dictated by the nature of flow separation and is time dependent over the stroke cycle.

In one embodiment, one or more differential pressure sensor is disposed between front and back surfaces of a bluff body, i.e., a hand, paddle, or other object. The differential pressure sensor measures a differential pressure profile across the object as it moves through the water to create propulsion. The differential pressure sensor is connected to a data acquisition device that receives the sensor's output. An inertial measurement unit (IMU), having at least a gyroscope and an accelerometer, is used together with the differential pressure sensor. The IMU may be located at or the near centroid of the object, and tracks the real-time position, velocity, and angle of the object as it moves through the water to create propulsion. The IMU output is also received by the data acquisition device. The data acquisition device sends differential pressure data obtained from the one or more differential pressure sensor and position, velocity, and angle data from the IMU to a processor for real-time, or near real-time, processing according to calibration data and the physics-based model. Embodiments may include a communications device for wireless data transfer with a remote computer, server, or mobile device. Embodiments quantify the total force vector acting on the object as a function of time, from which the power of the stroke is determined. Thus, embodiments may be configured to measure force, or power, or both force and power.

In one embodiment, one or more sensors are disposed at each of various locations on the object. The one or more sensors output sensor signals from which information such as one or more of differential pressure, position, velocity (linear velocity and/or rotational velocity), and linear acceleration and/or rotational acceleration may be obtained, at different locations on the object. For example, the object may include multiple segments connected together in either a fixed or moveable (i.e., adjustable) arrangement, and the sensors may be disposed on two or more segments to provide information corresponding to the two or more segments. Such embodiments may be configured to measure force, or power, or both force and power at each of the sensor locations, and at each of the segments of the object. In the example of a swimmer, such sensors may be disposed on different segments of a limb, such as the hand, forearm, and upper arm (between the elbow and shoulder). For a swimmer, the sensors may be incorporated into clothing such as a swim shirt, swim shorts, swim pants, gloves, boots, or wetsuit, for example. Positional sensors may provide overall three-dimensional orientation of the swimmer's body, allowing for in-depth reconstruction of stroke mechanics. Analysis of reconstructed stroke mechanics with correlating power profile will allow swimmers to refine their stroke mechanics to yield the greatest results. Differential pressure sensors, or other sensors providing information on fluid flow profiles, may be used to determine local and overall hydrodynamic resistance.

Power meter embodiments used in applications such as water sports are battery-powered, completely submersible, and capable of wireless data transfer to a remote device such as a computer or mobile device such as a smart phone. Processing may be performed on-board by the power meter, and the resultant output power transmitted to a remote device. Alternatively, processing may be performed by a remote device, in which case substantially raw differential pressure sensor data and IMU data are transmitted to the remote device. Such a latter configuration may be preferable for applications such as swimming, as the power meter may be implemented in a lighter and more compact form. In some embodiments, the remote device may be located on a swimmer, for example a computing device placed on the back of the swimmers head and secured using a swimmer's cap and/or goggle straps. The remote device may then communicate power-based and other swimming metrics in real-time to the swimmer via submersible earbuds or heads-up display image projection on the goggles, for example.

To obtain calibration data, a test article may be instrumented with one or more differential pressure sensor and a 6-component force/moment sensor. In this way, differential pressure data may be directly correlated with real forces acting on the model over a broad range of motions and conditions. Through ground-truth instantaneous force measurements as a function of the pressure differential and object motion, an unambiguous relationship between the input signal (pressure differential and position, velocity, and angle) and the output force signal may be mapped. Given this relationship, the resulting power may then be calculated by tracking the output differential pressure signal over time.

Figure 2:
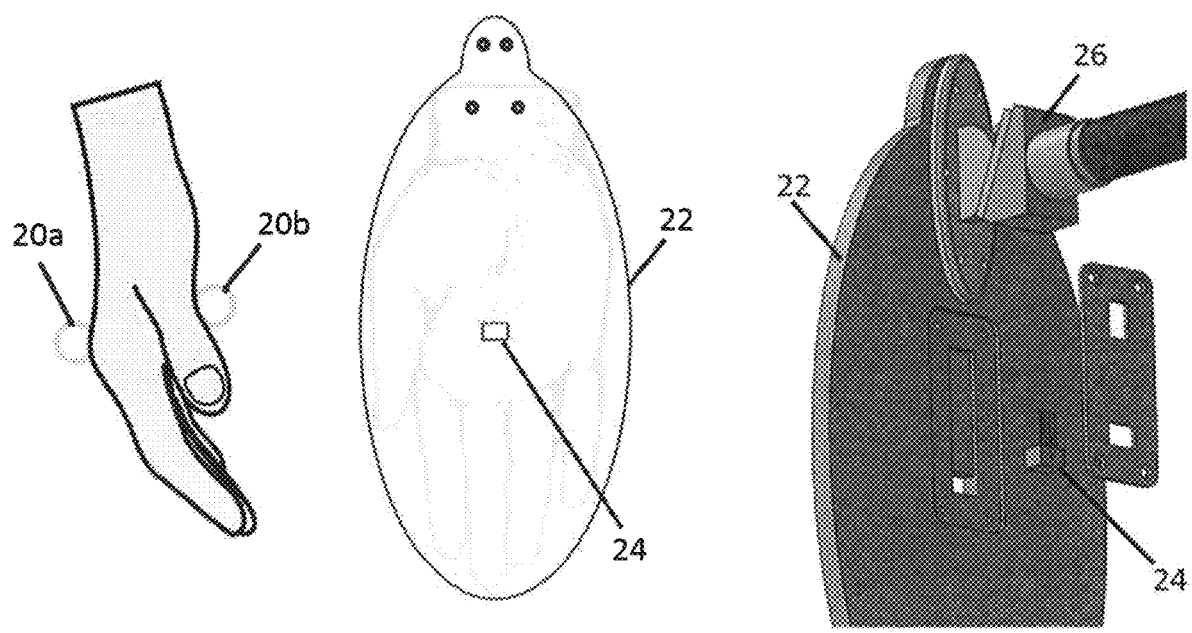
FIG. 2 is a diagram of a test article used to obtain calibration data to relate differential pressure data to force.
Figure 3:
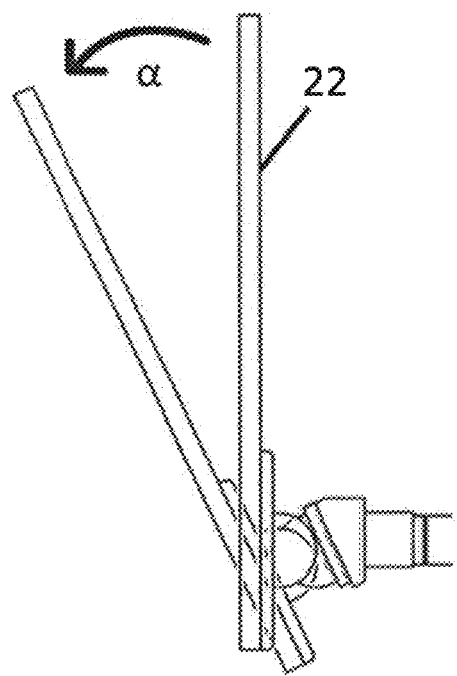
FIG. 3 is another diagram of the test article of FIG. 2.

FIGS. 2 and 3 show an experimental test article used in preliminary tests in an experimental towing tank with motorized traverse which provided a controlled environment. The towing tank had a 1 m×1 m cross section with a 15 m length, permitting high Reynolds number measurements with towing speeds of up to 1.5 m/s. FIG. 2 shows possible locations 20a and 20b for a differential pressure sensor on a hand, and an analogue object 22 approximately the size and shape of a hand. The test article was equipped with an embedded differential pressure sensor 24 (PX26, Omega Engineering Inc., Norwalk, Conn., USA) and a 6-axis force sensor 26 (Nano, ATI Industrial Automation, Inc., Apex, N.C., USA). As shown in FIG. 3, the test article allowed the angle of attack $\alpha$ to be adjusted (arrow). Using this setup, the differential pressure reading can be directly correlated to real forces acting on an object moving in a fluid. By having ground-truth force values as a function of the pressure differential and the angle of attack, the power meter produced accurate results without having to compute the complex fluid dynamics of the object during its motion (such as swimming or paddling). The towing tank experiments identified trends used to develop and optimize the physics-based model.

Figure 4:
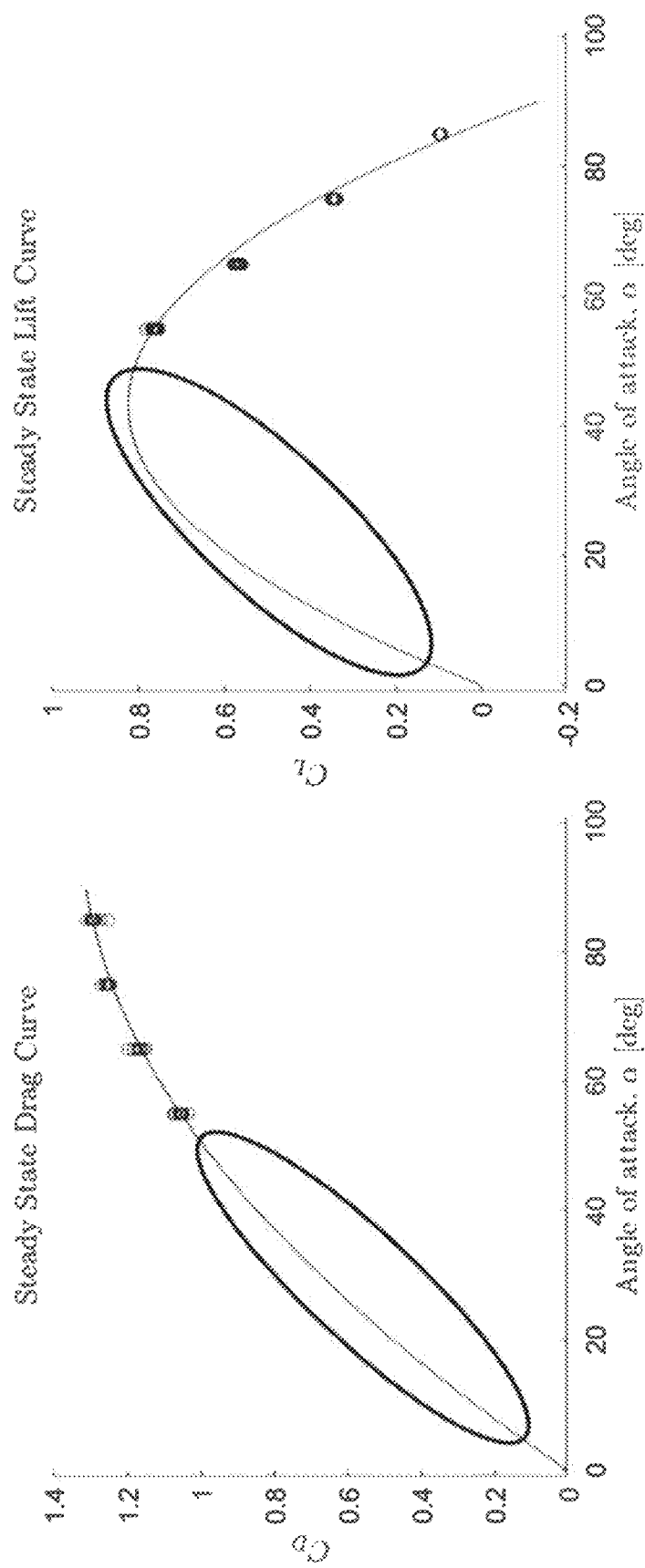
FIG. 4 shows plots of steady state drag and lift as a function of angle of attack, obtained from towing tank experiments.
Figure 5:
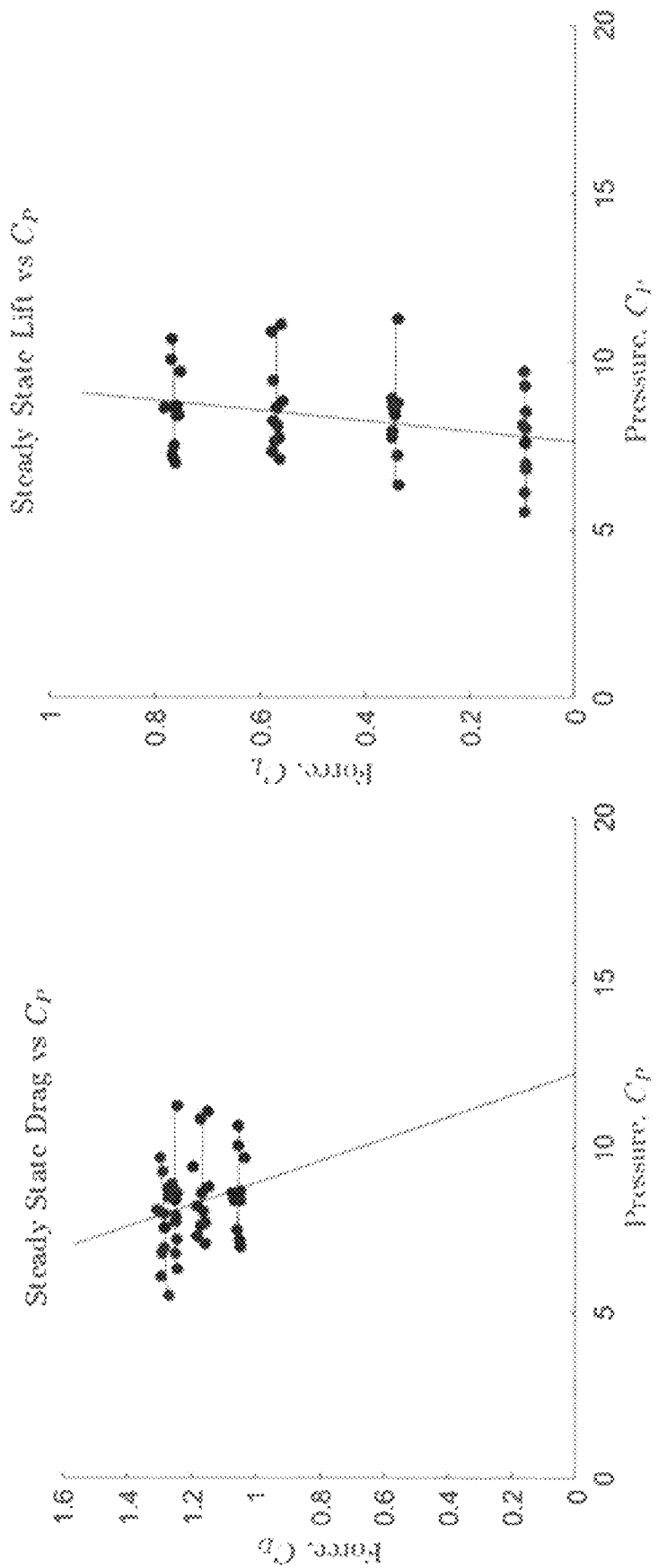
FIG. 5 shows plots of steady state drag and lift as a function of angle of pressure, obtained from towing tank experiments.

FIG. 4 shows steady state drag and lift as a function of angle of attack, obtained from the towing tank experiments. FIG. 5 shows steady state drag and lift as a function of angle of pressure, obtained from the towing tank experiments. These relationships were used to develop the low-order (physics-based) model.

Figure 6:
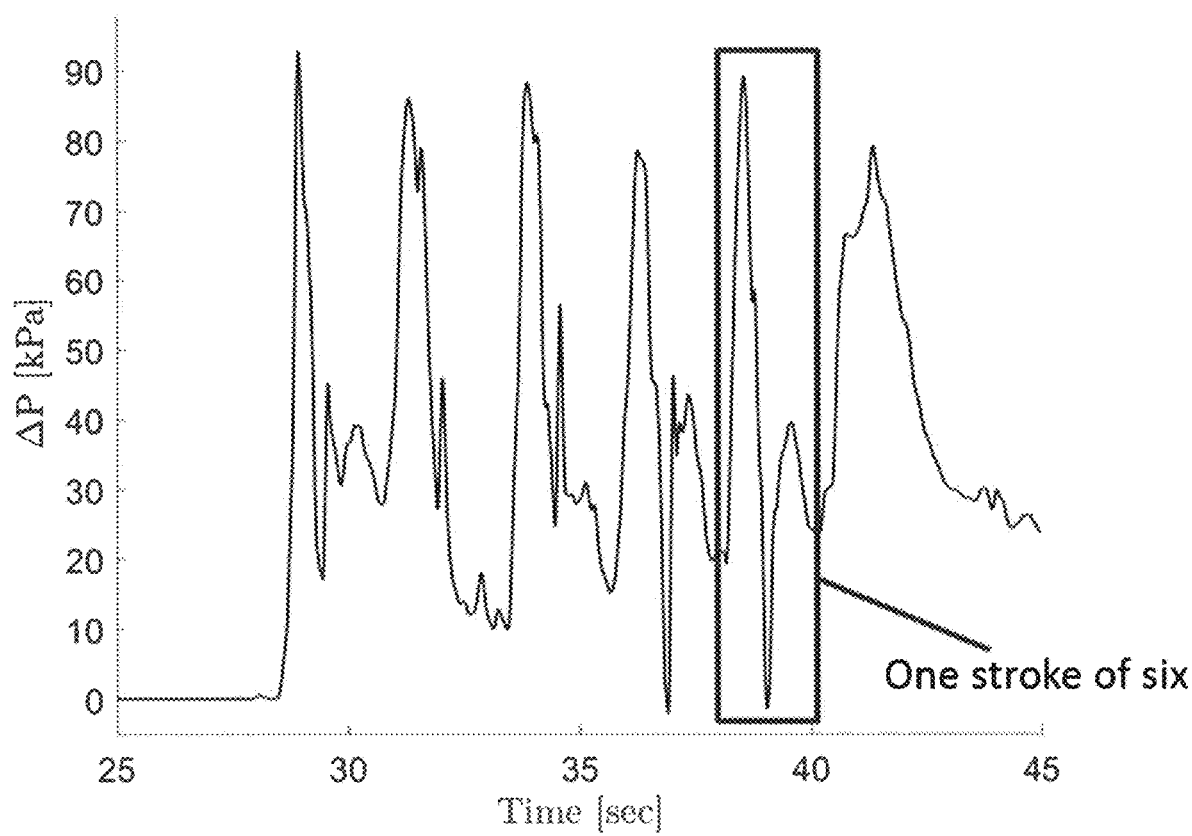
FIG. 6 is a plot showing differential pressure data obtained from a differential pressure sensor fitted to a swimmer's hand.

Preliminary differential pressure data were obtained by fitting a differential pressure sensor between the middle and ring fingers of a swimmer. Data for six strokes are shown in FIG. 6, with a box drawn around the fifth stroke. The data confirm that clear, consistent differential pressure data can be obtained with this configuration.

Figure 7:
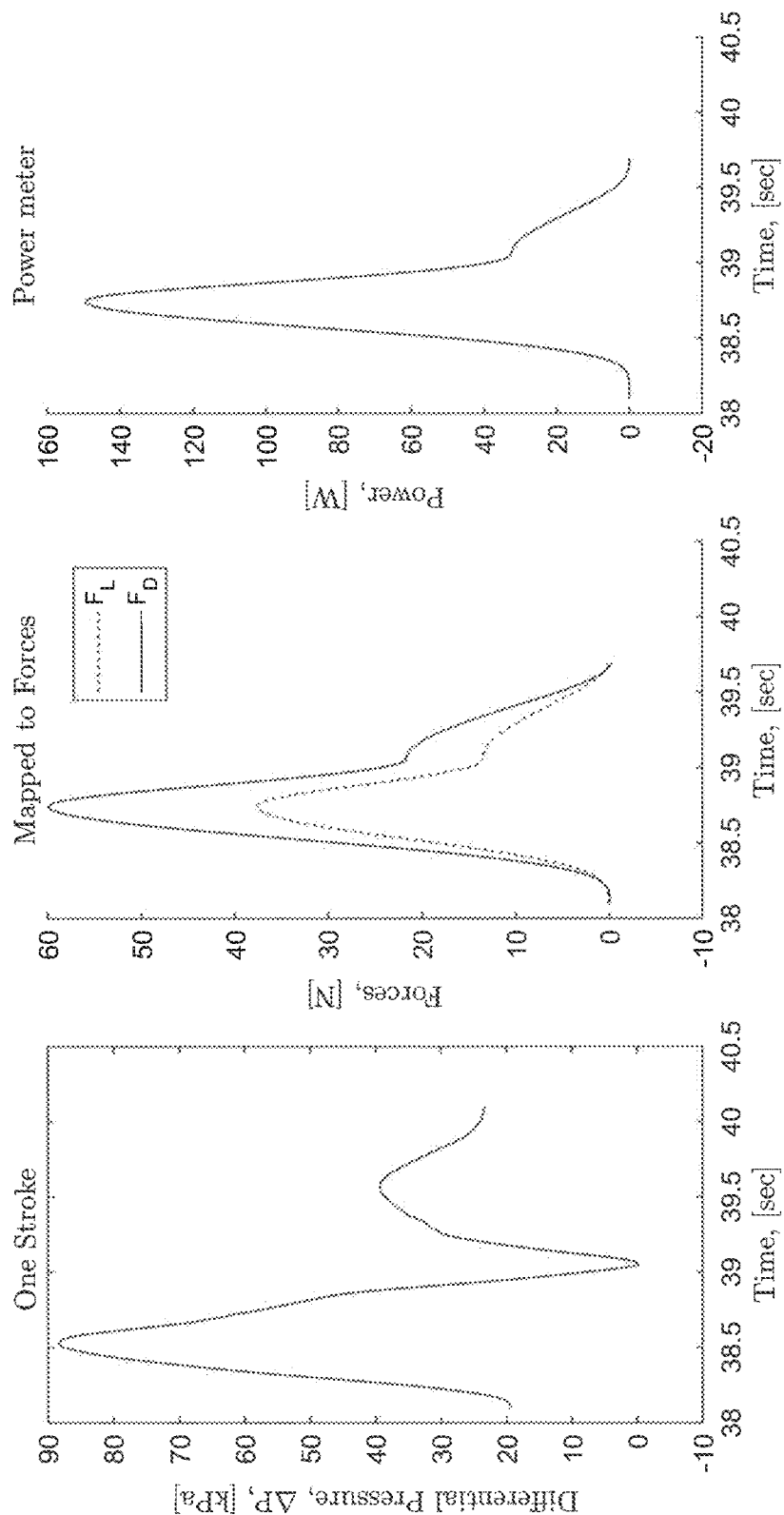
FIG. 7 shows plots of differential pressure data for one swimming stroke (left panel), lift and drag data mapped to differential pressure data (center panel), and power delivered during the swimming stroke (right panel) as an output of a swimming power meter according to an embodiment described herein.

FIG. 7 left panel shows differential pressure data for one swimming stroke. In FIG. 7 center panel, the lift and drag data are mapped to the differential pressure data. In FIG. 7 right panel, the low-order (physics-based) model is applied to determine the actual power delivered during the swimming stroke, which is the output of the power meter.

All cited publications are incorporated herein by reference in their entirety.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. Apparatus for measuring force on an object in a fluid, wherein at least one of the object and the fluid is moving, comprising:
    at least one differential pressure sensor adapted to be disposed on the object that outputs at least one sensor signal corresponding to an instantaneous pressure differential resulting from unsteady fluid flow over first and second surfaces of the object;

a data acquisition device that receives the at least one differential pressure sensor signal; and a processor in communication with the data acquisition device that processes differential pressure data derived from the at least one differential pressure sensor signal to determine instantaneous differential pressure values, and incorporates the differential pressure values in a low-order unsteady force model that accounts for time-dependent flow separation around the object to output a measure of the instantaneous force on the object in the fluid, as a function of time.

2. The apparatus of claim 1, wherein the at least one differential pressure sensor comprises:

a first absolute pressure sensor adapted to be disposed on the first surface of the object and outputs a sensor signal corresponding to a pressure on the first surface of the object;

a second absolute pressure sensor adapted to be disposed on the second surface of the object outputs a sensor signal corresponding to a pressure on the second surface of the object;

wherein the acquisition device receives the sensor signals corresponding to the pressures on the first and second surfaces of the object;

wherein the processor determines a differential pressure on the object from the sensor signals corresponding to the pressures on the first and second surfaces of the object.

3. The apparatus of claim 1, further configured for measuring power exerted by the object moving in the fluid, comprising:

at least one second sensor disposed on the object that outputs at least one second sensor signal;

wherein the data acquisition device receives the at least one second sensor signal;

wherein the processor processes differential pressure data derived from the at least one differential pressure sensor signal and at least velocity data derived from the at least one second sensor signal and outputs a measure of the power exerted by the object moving in the fluid, as a function of time.

4. The apparatus of claim 3, wherein the at least one second sensor outputs at least one second sensor signal corresponding to linear velocity and/or rotational velocity.

5. The apparatus of claim 3, wherein the at least one second sensor comprises an inertial measurement unit (IMU) that outputs at least one second sensor signal corresponding to linear and rotational acceleration of the object moving in the fluid.

6. The apparatus of claim 3, wherein the processor subjects the differential pressure data and the velocity data to processing according to calibration data and a low-order model based on motion of the object.

7. The apparatus of claim 3, further comprising a location sensor disposed on the object or in close proximity to the object that outputs a signal corresponding to location of the object.

8. The apparatus of claim 3, wherein the apparatus outputs a measure of the power exerted by a human limb, a part of a human limb, or a paddle moving in water.

9. The apparatus of claim 1, wherein the object is selected from a human limb, a part of a human limb, and a paddle.

10. The apparatus of claim 9, wherein the object is a human hand, and the first and second surfaces are a palm and a back of the hand.

11. The apparatus of claim 10, wherein the apparatus is adapted to fit between fingers of the hand.

12. A method for measuring force on an object in a fluid, wherein at least one of the object and the fluid is moving, comprising:

disposing at least one differential pressure sensor on the object wherein the at least one differential pressure sensor outputs at least one sensor signal corresponding to an instantaneous pressure differential resulting from unsteady fluid flow over first and second surfaces of the object;

receiving the at least one sensor signal; and using a processor to process differential pressure data derived from the at least one differential pressure sensor signal to determine instantaneous differential pressure values, and incorporate the differential pressure values in a low-order unsteady force model that accounts for time-dependent flow separation around the object to output a measure of the instantaneous force on the object in the fluid, as a function of time.

13. The method of claim 12, comprising:

disposing a first absolute pressure sensor on the first surface of the object, wherein the first absolute pressure sensor and outputs a sensor signal corresponding to a pressure on the first surface of the object;

disposing a second absolute pressure sensor on the second surface of the object, wherein the second absolute pressure sensor outputs a sensor signal corresponding to a pressure on the second surface of the object;

receiving the sensor signals corresponding to the pressures on the first and second surfaces of the object;

using the processor to determine a differential pressure on the object from the sensor signals corresponding to the pressures on the first and second surfaces of the object.

14. The method of claim 12, further configured for measuring power exerted by the object moving in the fluid, comprising:

disposing at least one second sensor on the object wherein the at least one second sensor outputs at least one second sensor signal;

receiving the at least one second sensor signal; and using a processor to process differential pressure data derived from the at least one differential pressure sensor signal and velocity data derived from the at least one second sensor signal and output a measure of the power exerted by the object moving in the fluid, as a function of time.

15. The method of claim 14, wherein the at least one second sensor outputs at least one second sensor signal corresponding to linear velocity and/or rotational velocity.

16. The method of claim 14, wherein the at least one second sensor comprises an IMU that outputs at least one second sensor signal corresponding to linear and rotational acceleration of the object moving in the fluid.

17. The method of claim 14, wherein the processor subjects the differential pressure data and the velocity data to processing according to calibration data and a low-order model based on motion of the object.

18. The method of claim 14, further comprising disposing a location sensor on the object or in close proximity to the object wherein the location sensor outputs a signal corresponding to location of the object.

19. The method of claim 14, wherein the processor outputs a measure of the power exerted by a human limb, a part of a human limb, or a paddle moving in water.

20. The method of claim 19, wherein the object is a human hand, and the first and second surfaces are a palm and a back of the hand.

21. The method of claim 12, wherein the object is selected from a human limb, a part of a human limb, and a paddle.

\* \* \* \* \*